(12) United States Patent  
Al-Dossary et al.

(10) Patent No.: US 8,855,440 B2  
(45) Date of Patent: Oct. 7, 2014

(54) STRUCTURE-INDEPENDENT ANALYSIS OF 3-D SEISMIC RANDOM NOISE

(75) Inventors: Saleh Al-Dossary, Dammam (SA); Yuchun Eugene Wang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 1019 days.

(21) Appl. No.: 12/221,628

(22) Filed: Aug. 4, 2008

(65) Prior Publication Data

US 2010/0027848 A1    Feb. 4, 2010

(51) Int. Cl.
*G06K 9/00* (2006.01)
*G01V 1/36* (2006.01)

(52) U.S. Cl.
CPC .............. *G06K 9/0051* (2013.01); *G01V 1/362* (2013.01); *G01V 2210/32* (2013.01)
USPC ............................ 382/275; 382/254; 382/274

(58) Field of Classification Search
CPC ........................................................ G06T 5/002
USPC .................................................. 382/109, 275
See application file for complete search history.

(56) References Cited

U.S. PATENT DOCUMENTS 4,542,459 A    9/1985  Riederer
6,330,512 B1  12/2001  Thomas 2004/0098200 A1 *  5/2004  Wentland et al. ................. 702/2
2007/0236609 A1   10/2007  Pathak
2008/0175478 A1    7/2008  Wentland

OTHER PUBLICATIONS

Sebastien Guillon et al, Adaptive nonlinear filters for 2D and 3D image enhancement, Signal Processing 1998.*
Motofumi Suzuki et al, A Shape Feature Extraction Method Based on 3D Convolution Masks, IEEE 2006.*
Wolfram Mathematica Tutorial, Multiplying Vectors and Matrices, extracted from http://web.archive.org/web/20080430080954/http://reference.wolfram.com/mathematica/tutorial/MultiplyingVectorsAndMatrices.html.*
An article on Matrix Algebra published on http://www.eigenvector.com/Docs/MatrixAlgebra.pdf, dated 2003.*
ISR & Written Opinion, PCT/US 09/04484, mailed Sep. 18, 2009.

* cited by examiner

*Primary Examiner* — Chan Park
*Assistant Examiner* — Mark Roz
(74) *Attorney, Agent, or Firm* — Abelma, Frayne & Schwab (57) ABSTRACT

A system and method identify and display random noise in three dimensional (3-D) seismic data utilizing a 3-D operator to reduce the effects of seismic structure on noise identification. The 3-D operator is derived using statements of required performance in 3-D. The 3-D operator is applied on a pixel-by-pixel basis to each of the pixels in the 3-D post-stacked data to display images in a 3-D display or to output an estimate of noise that is substantially independent of the image structure. The resulting display is generated in colors to indicate noise amplitude to facilitate location of noisy regions in the original display.

2 Claims, 8 Drawing Sheets

$$\begin{vmatrix} 1 & 1 & 1 & 0 & 0 & 0 \\ 1 & 1 & 1 & 0 & 0 & 0 \\ 1 & 1 & 1 & 0 & 0 & 0 \\ 1 & 1 & 1 & 0 & 0 & 0 \\ 1 & 1 & 1 & 0 & 0 & 0 \\ 1 & 1 & 1 & 0 & 0 & 0 \end{vmatrix} \quad \begin{vmatrix} 1 & 1 & 1 & 1 & 1 & 1 \\ 1 & 1 & 1 & 1 & 1 & 1 \\ 1 & 1 & 1 & 1 & 1 & 1 \\ 0 & 0 & 0 & 0 & 0 & 0 \\ 0 & 0 & 0 & 0 & 0 & 0 \\ 0 & 0 & 0 & 0 & 0 & 0 \end{vmatrix} \quad \begin{vmatrix} 1 & 0 & 0 & 0 & 0 & 0 \\ 1 & 1 & 0 & 0 & 0 & 0 \\ 1 & 1 & 1 & 0 & 0 & 0 \\ 1 & 1 & 1 & 1 & 0 & 0 \\ 1 & 1 & 1 & 1 & 1 & 0 \\ 1 & 1 & 1 & 1 & 1 & 1 \end{vmatrix}$$
(a)            (b)            (c)

FIG. 8(a) - 8(c)

$$\begin{vmatrix} 1 & 2 & 3 & 4 & 5 & 6 \\ 2 & 3 & 4 & 5 & 6 & 7 \\ 3 & 4 & 5 & 6 & 7 & 8 \\ 4 & 5 & 6 & 7 & 8 & 9 \\ 5 & 6 & 7 & 8 & 9 & 10 \\ 6 & 7 & 8 & 9 & 10 & 11 \end{vmatrix}$$

FIG. 9

STRUCTURE-INDEPENDENT ANALYSIS OF 3-D SEISMIC RANDOM NOISE

FIELD OF THE INVENTION

The present invention relates generally to the field of image processing and specifically to the suppression of image data in order to estimate and identify random noise in post-stacked three-dimensional (3-D) seismic data containing geological structure such as faults.

BACKGROUND OF THE INVENTION

Data reliability is a major concern in seismic data interpretation since the choice of a drilling location and the likelihood that a drilling operation will be successful is based on the accuracy and reliability of the data used to make drilling-related decisions. The estimation and display of random noise is therefore one of most important factors in data reliability assessment. This assessment, in turn, can be used in reservoir engineering studies.

In the field of seismic exploration there are a number of techniques for noise analysis that have been proposed. One approach that provides for noise estimation in a 3-D post-stacked display of seismic data is described in Dash, B and K. A. Obaidullah, "Determination of signal and noise statistics using correlation theory", Geophysics, 1970, 35, 24-32 ("Dash and Obaidullah"). Assuming an image signal is correlated from trace to trace and noise is not correlated, Dash and Obaidullah applied correlation theory to deduce signal power from cross-correlation and total power from auto-correlation. The power of noise is then extracted from the difference. The shortcoming is that seismic traces are not correlated when crossing a fault or nonconformity. This method of noise estimation is therefore biased by geological structures.

The method described by Potter and Roden uses horizontal component records to estimate noise in a vertical direction. The method only works for strong directional noise and does not apply to 3-D post-stacked data. There are usually three basic steps in image noise variance estimation. These are: (1) image structure suppression, (2) local variance estimation and (3) global variance estimation. The most important step among them is image structure suppression. Potter, T. F. and R. B. Roden, "Seismic noise estimation using horizontal components", Geophysics, 1999, No. 4, pp. 617-632. Rank et al. discloses the use of a simple two-tap difference filter in both the horizontal and vertical directions to suppress the image structure. It has been found that the filters should be cascaded for better results. However, this simple two-tap FIR filtering also leaves a lot of edge information in the filtered images, so that special post-processing is required in the global variance estimation stage to correct for noise variance. Rank, K., M. Lendi and R. Unbehauen, 1999, "Estimation of Image Noise Variance," IEE Proc.-Vis. Image Signal Process., Vol. 146, No. 2, pp. 80-84.

In order to better suppress an image structure in two dimensions, the use of the difference of two Laplacian filters as the mask to filter the image is described in J. Immerkaer, "Fast Noise Variance Estimation", Computer Vision and Image Understanding, 1996, Vol. 64, No.2, pp. 300-302 ("Immerkaer)". There is no suggestion in the Immerkaer article for a 3-D mask or means for smoothing to remove the anisotropic effects of the Immakaer mask.

The following patents disclose methods for noise reduction in an image containing image and noise which is not relevant to the reliability of the data. For example, U.S. Pat. No. 5,461,655 discloses a method and apparatus for noise reduction in the context of medical radiography imaging. Published application US 20040066978 discloses an image processing method and image processing apparatus for use in connection with medical imaging. The disclosures of U.S. Pat. Nos. 7,085,426 and 7,130,484 describe the use of Volterra filters for enhancement of contours in noisy images, e.g., in medical applications and in the x-ray scanning for weapons transports. Published application US 20020012472 discloses a method for visualization of time sequences of 3-D optical fluorescence microscopy images, and specifically a method for compressing 4-D image data to accelerate its visualization (see FIGS. 3-6).

A method for sharpness enhancement in the display of TV images employing a specified filter is disclosed in U.S. Pat. No. 6,847,738. Finally, U.S. Pat. No. 5,844,627 discloses a structure and method for reducing spatial noise in processing digital video signals.

The prior art methods of these patents do not improve on the ability to recognize valid structure in the presence of random noise. It is therefore an object of the present invention to provide an assessment of the reliability of derived seismic attributes based on random noise estimation.

SUMMARY OF THE INVENTION

In accordance with the present invention, a system and method for identifying and displaying random noise in 3-D seismic data utilizing a new 3-D operator to reduce the effects of seismic structure on noise identification is provided. The new operator is derived using statements of required performance in 3-D. The operator is then applied on a pixel-by-pixel basis to each of the pixels in the 3-D post-stacked data to provide in a 3-D display or estimate of noise that is substantially independent of the image structure. In a preferred embodiment, the resulting display is generated in colors to indicate noise amplitude and thus facilitate location of noisy regions in the original display.

Alternatively, the display can be presented in shades of gray. However, as will be understood by one of ordinary skill in the art, the task of interpretation of the visual display will be facilitated by the use of color.

As used herein, the term "pixel" means the smallest addressable point in the 3-D post-stacked data, or a filtered version of the data, that gives the magnitude of the point.

The present invention is based on a 3×3 mask whose members are developed by a statement of performance requirements rather than the subtraction of two Laplacian filters as in the Immerkaer mask of the prior art. The method of the invention provides for the extension of the features of the Immerkaer mask from 2-D to 3-D.

The present invention thus overcomes the limitations of the prior art by the use of a 3-D mask to suppress structure in a 3-D image containing structure and random noise and therefore help decide which image data is likely structure and which is noise.

As described in further detail below, the present invention utilizes a performance-based method for deriving an Immerkaer 2-D mask and then extends the method to 3-D. In addition the present invention provides smoothing to remove the anisotropic effects of the Immakaer mask. The invention will perform random noise estimation in the presence of structures correctly and will not be affected by seismic structures.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

The invention is further described below with reference to the attached drawings in which:

FIG. 6b shows a range of colors used to indicate Seismic Amplitude in FIG. 6a;

FIG. 6c is a presentation of the results achieved by applying the mask of the present invention to the seismic data of FIG. 6a;

FIGS. 8(a) through 8(c) are matrix representations of, respectively, vertical, horizontal and diagonal step data.

DETAILED DESCRIPTION OF THE INVENTION

Figure 1:
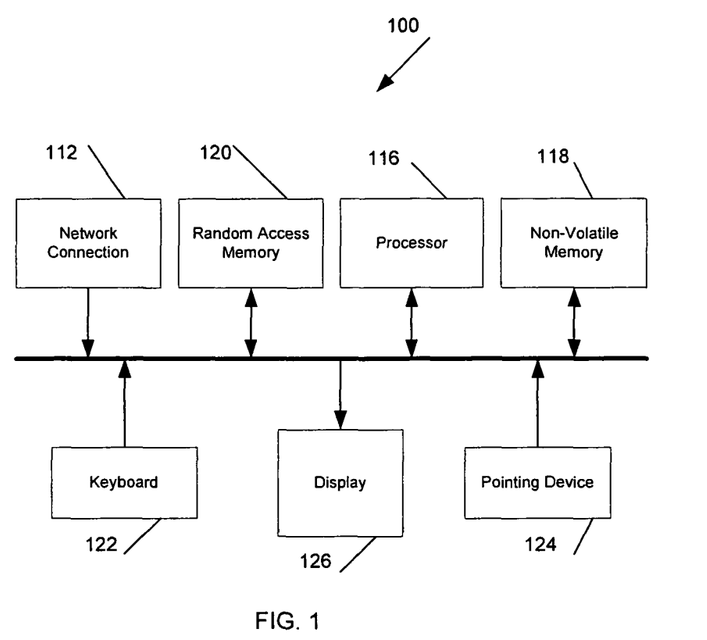
FIG. 1 is a schematic illustration of a computer-based system suitable for the practice of the present invention.

Referring to FIG. 1, a suitable computer-based system 100 for the practice of the present invention is shown and includes non-volatile memory 118 which receives and stores post-stacked data 120 from a data acquisition system (not shown). Random access memory 120 provides a working space for the analysis of the image and isolation of its noise components while non-volatile memory 118 provides storage for operating system, input/output and 3-D display software. Non-volatile memory 118 also provides storage for the instructions to suppress image structure based on the mask and the algorithm that is discussed below in conjunction with FIG. 3A. In a preferred embodiment, processor 116 performs all housekeeping and analysis calculations, while in an alternate embodiment analysis calculations are performed in a separate digital signal processor (DSP) (not shown) to accelerate numerical calculations. Post-stacked seismic data can be entered into computer based system 100 via network connection 112, an alternate serial connection (not shown) or via movable media such as a flash memory or compact disk. The Linux operating system is preferred, but the Unix operating system or a Windows operating system can be used in the alternative.

Other elements of computer based system 100 include: keyboard 122, display 126 which is preferably a color electronic display that may be used in conjunction with a printing device (not shown) and pointing device 124.

The process for the development of the 3-D mask of the present invention will be described with reference to prior art methods and techniques.

The fast noise variance estimation algorithm disclosed by Immerkaer (1996) is based on the difference of two Laplacian filters to suppress the influence of image structure. The general form of the Laplacian filter can be represented as:

$$L_\alpha = \frac{1}{1+\alpha} \times \begin{pmatrix} \alpha & 1-\alpha & \alpha \\ 1-\alpha & -4 & 1-\alpha \\ \alpha & 1-\alpha & \alpha \end{pmatrix}, \quad (1)$$

where $\alpha$ is a parameter between 0 and 1. It can be verified easily that Immerkaer's mask is twice the difference between $L_1$ and $L_0$.

$$2(L_1 - L_0) = \begin{pmatrix} 1 & 0 & 1 \\ 0 & -4 & 0 \\ 1 & 0 & 1 \end{pmatrix} - 2\begin{pmatrix} 0 & 1 & 0 \\ 1 & -4 & 1 \\ 0 & 1 & 0 \end{pmatrix} = \begin{pmatrix} 1 & -2 & 1 \\ -2 & 4 & -2 \\ 1 & -2 & 1 \end{pmatrix}. \quad (2)$$

The properties inherent in the Immerkaer mask can be described as follows:

(1) When filtering constant gray level with the Immerkaer mask, the output is zero. This is ensured by the zero sum property of the Immerkaer mask entries.

Figure 9:
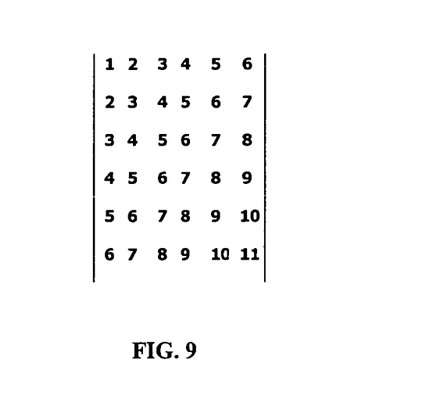
FIG. 9 is a matrix representation of constant slope data.

(2) When filtering the constant slope ramp with the Immerkaer mask, the output is zero. This property is also guaranteed by the zero sum property of the Immerkaer mask entries. A constant slope ramp is shown using a matrix representation in FIG. 9.

Figures 8A, 8C:
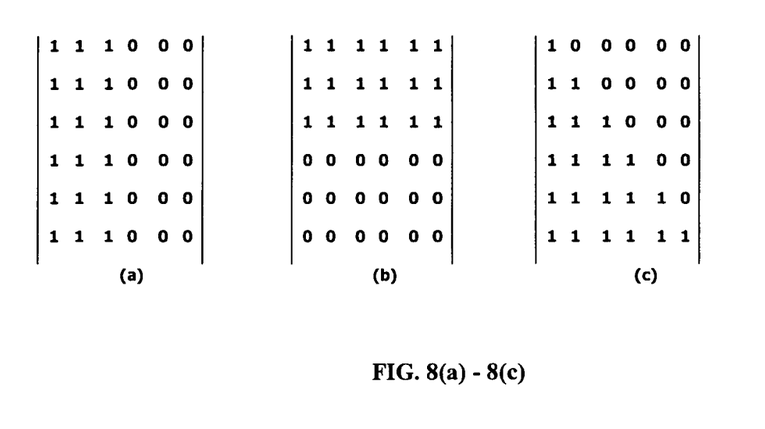

(3) When the image has vertical or horizontal step edges, as shown by the matrix representations in FIG. 8(a) and FIG. 8(b), the output of filtering with the Immerkaer mask is also zero.

(4) When the image has diagonal step edges, as shown by the matrix representation in FIG. 8(c), the output of filtering with the Immerkaer mask is not zero.

(5) The Immerkaer mask is symmetric in the directions of the three principal axes.

Considering these properties, the first three are good properties and can be used to suppress such image structures as constant gray level, ramp edges and step edges. The fourth property has been found to be the main drawback of the Immerkaer scheme. This is due to the anisotropy of the operator and can be partially alleviated with a smoothing scheme.

The present invention utilizes a mask embodying the following desired design properties:

(1) The mask coefficients should be zero sum. This property will guarantee that the mask will suppress the constant gray level and constant slope ramps.

(2) When the range of mask contains a horizontal edge or vertical edge, the output of the filtering should be zero.

(3) The mask should be symmetric in three principal axis directions.

(4) Noise variance conservation is added as a requirement for the test case that follows and the 3-D mask. The image noise is assumed to be independent Gaussian noise. When passing Gaussian noise through the designed mask, the noise is no longer spatially independent, but correlated noise. Therefore, the noise variance will not change.

The above requirements can be formulated as an optimization problem for a 2-D mask in order to show that the optimization procedure based on mask performance will lead to an Immakaer mask in 2-D.

According to requirement (1) above, the mask should have the following structure:

$$\text{mask} = \begin{pmatrix} x_2 & x_3 & x_2 \\ x_3 & x_1 & x_3 \\ x_2 & x_3 & x_2 \end{pmatrix} \quad (3)$$

In the mask template of equation 3, the three coefficients $x_1$, $x_2$ and $x_3$ must be determined. The symmetry requirement (1) is already satisfied by the location of the mask coefficients $x_1$, $x_2$, and $x_3$. The zero-sum requirement (1) implies the following relationship:

$$x_1 + 4x_2 + 4x_3 = 0. \quad (4)$$

Figure 2:
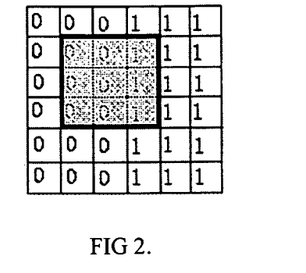
FIG. 2 is a section on an image having a vertical edge.

From requirement (2) and assuming a vertical edge as shown in FIG. 2, the following is derived:

$$2x_2 + x_3 = 0. \quad (5)$$

The normalization requirement (4) yields $$x_1^2 + 4x_2^2 + 4x_3^2 = 1. \quad (6)$$

Equations 4, 5 and 6, are grouped as follows:

$$\begin{cases} x_1 + 4x_2 + 4x_3 = 0 \\ 2x_2 + x_3 = 0 \\ x_1^2 + 4x_2^2 + 4x_3^2 = 1 \end{cases} \quad (7)$$

Solving the group of equations yields the following:

$$\begin{pmatrix} x_1 \\ x_2 \\ x_3 \end{pmatrix} = \frac{1}{6} \begin{pmatrix} 4 \\ 1 \\ -2 \end{pmatrix}. \quad (8)$$

Comparing this result with the Immerkaer mask indicates that it is a normalized version of the Immerkaer mask. This demonstrates that the Immerkaer mask is also an optimal mask under the criterion established above. This result serves as a basis for extending the mask design technique to higher dimensions.

Figure 3:
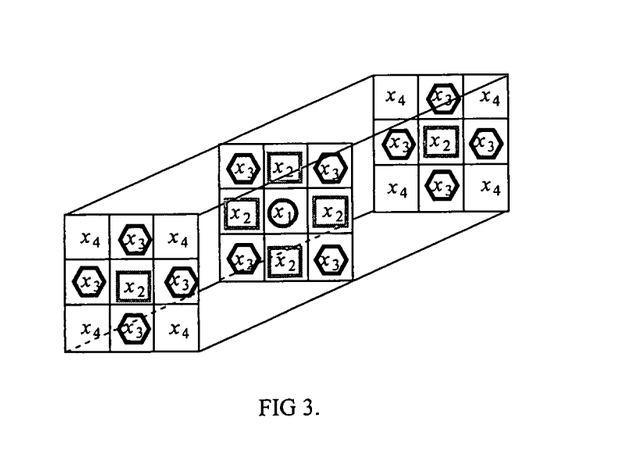
FIG. 3 is a pictorial representation of 3-D mask.

For the 3-D mask, as in the case of the 2-D mask, the symmetry requirement is established by the location of cell values illustrated in FIG. 3, in which configuration, the 3-D symmetric mask has 4 values to be determined.

The zero-sum requirement produces:

$$x_1 + 6x_2 + 12x_3 + 8x_4 = 0. \quad (9)$$

The zero-out requirement for edge and cornered edge structure yields, $$x_2 + 4x_3 + 4x_4 = 0. \quad (10)$$

$$x_3 + 2x_4 = 0. \quad (11)$$

Finally, the normalization requirement can be formulated as:

$$x_1^2 + 6x_2^2 + 12x_3^2 + 8x_4^2 = 1. \quad (12)$$

Solving equations 9 to 12 yields the 3-D mask cells as:

$$\begin{pmatrix} x_1 \\ x_2 \\ x_3 \\ x_4 \end{pmatrix} = \frac{1}{6\sqrt{6}} \begin{pmatrix} -8 \\ 4 \\ -2 \\ 1 \end{pmatrix}. \quad (12)$$

Alternatively, the 3-D operator can be written in un-normalized integer format, $$\text{mask} = \begin{pmatrix} 1 & -2 & 1 \\ -2 & 4 & -2 \\ 1 & -2 & 1 \end{pmatrix}, \begin{pmatrix} -2 & 4 & -2 \\ 4 & -8 & 4 \\ -2 & 4 & -2 \end{pmatrix}, \begin{pmatrix} 1 & -2 & 1 \\ -2 & 4 & -2 \\ 1 & -2 & 1 \end{pmatrix}. \quad (13)$$

This solution has some characteristics similar to the 2-D case. The center coefficient has the same sign as the diagonal coefficient and different sign then the non-diagonal coefficients. The coefficients closer to the center have larger absolute values. So the absolute values are decreasing from $x_1$ to $x_4$. The $x_4$ coefficient is the smallest in absolute value, since the distance from $x_4$ to the center is the largest.

Figure 3A:
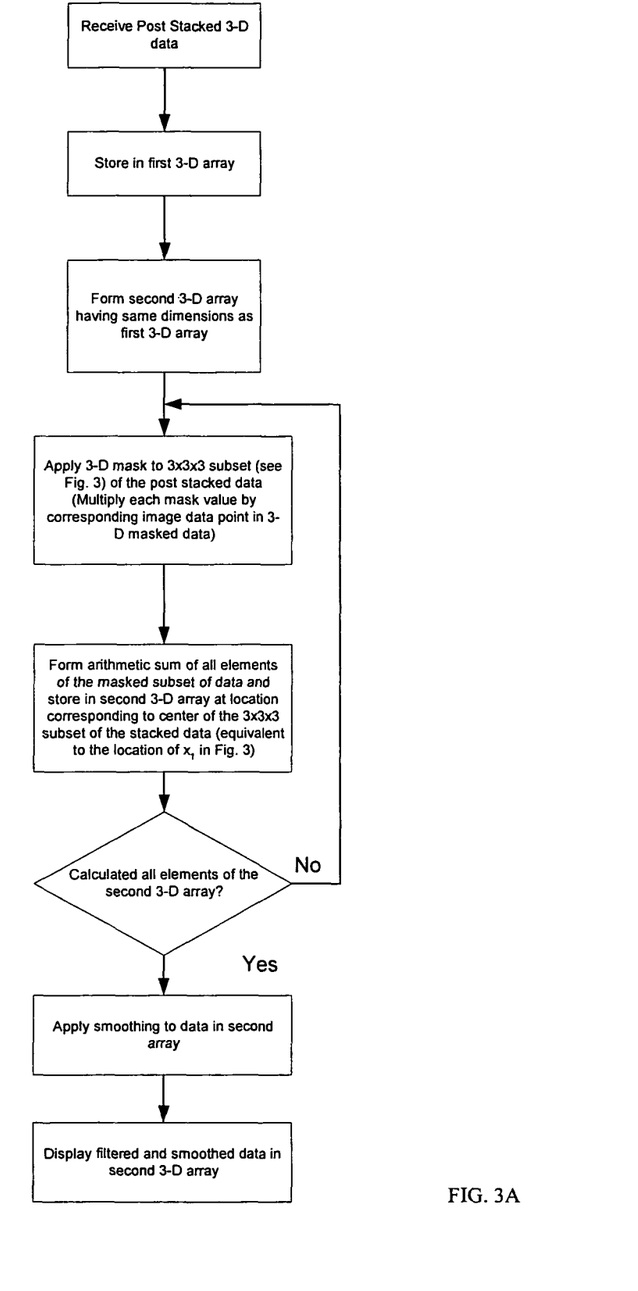
FIG. 3A flow chart of one implementation of the algorithm of the present invention.

In accordance with the present invention, the process of suppressing image structure is accomplished by replacing each pixel value in a post-stacked image with a new value determined by applying the image mask values to the corresponding pixels in cubed volumes shown schematically in FIG. 3 using the algorithm described in FIG. 3A. In the preferred embodiment, the estimated noise value at each pixel is then smoothed with a box-car filter preferably having an 11 pixel window to generate a local average and reduce the non-isotropic characteristics of the new mask.

EXAMPLES

The following examples utilize actual data to illustrate the results of applying the method and system of the present invention for noise estimation of 3-D post-stacked seismic data with the results box-car smoothed as described above. It is noted that in the preferred embodiment, the magnitude of each pixel ranges from 0 to 255, but in other embodiments the magnitude can range to other values.

Figure 4A:
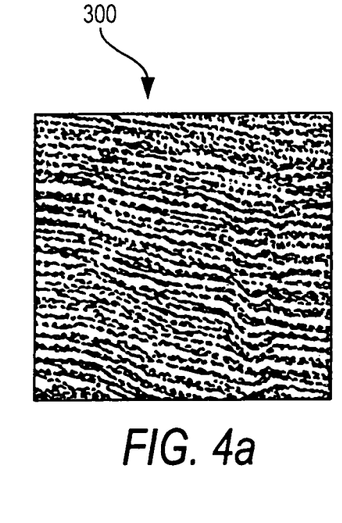
FIG. 4a is a 2-D display of seismic data.
Figure 4B:
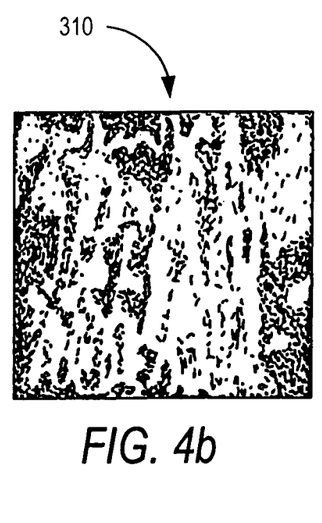
FIG. 4b is a 2-D display of the noise in FIG. 4a using a prior art method of noise analysis.
Figure 4C:
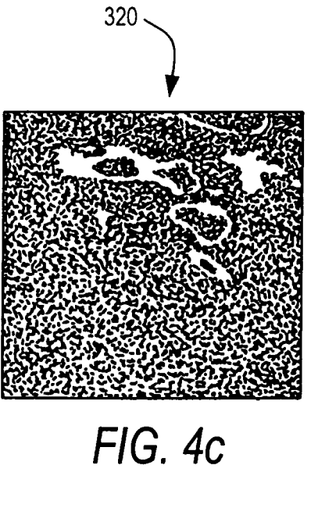
FIG. 4c is a 2-D display of the noise in FIG. 4a using a 2-D mask developed in accordance with the method of the present invention.
Figure 4D:
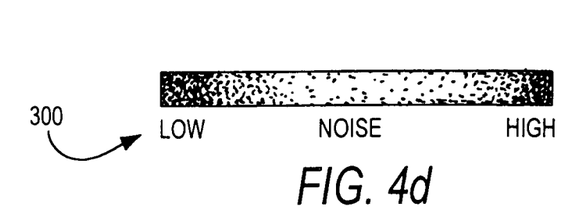
FIG. 4d shows a range of colors used to indicate levels of random noise in FIG. 4b and FIG. 4c.

To demonstrate the structure-independent property of the mask it is applied to the dataset in FIG. 4a with results given in FIG. 4c. Likewise, the prior art methodology of Dash and Obaidullah is applied to the same data set with results shown in FIG. 4b. Comparing the results shown in FIG. 4b and FIG. 4c, it can be seen that the faults at 300 which result in a loss of trace-to-trace correlation at the faults, show as a noisy area 310 in FIG. 4b, but do not appear in FIG. 4c. As demonstrated by FIG. 4b, the correlation method of Dash and Obaidullah produces high noise levels at locations of faults because the correlation method does not distinguish between noise and geological structures. As seen in FIG. 4c, the mask of the present invention does not show any bias due to faults and produces a more accurate display and estimation of noise. In accordance with techniques known in the art, the high noise areas of FIG. 4c are shown at 320 in a distinguishing color, e.g., red.

Figure 5A:
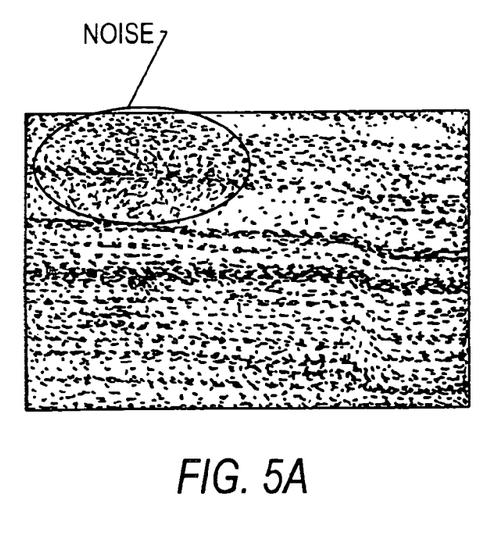
FIG. 5a is another example of 2-D seismic data.
Figure 5B:
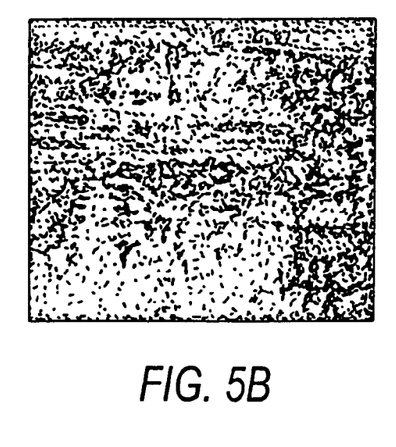
FIG. 5b is an estimate of the noise present in the 2-D data of FIG. 5a using a 2-D mask developed in accordance with the method of the present invention.
Figure 5C:
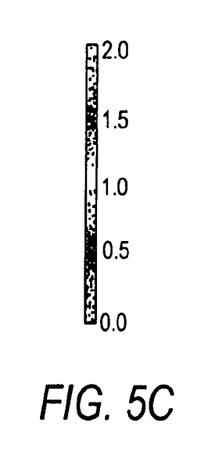
FIG. 5c shows a range of colors used to indicate levels of random noise in FIG. 5b.
Figure 6A:
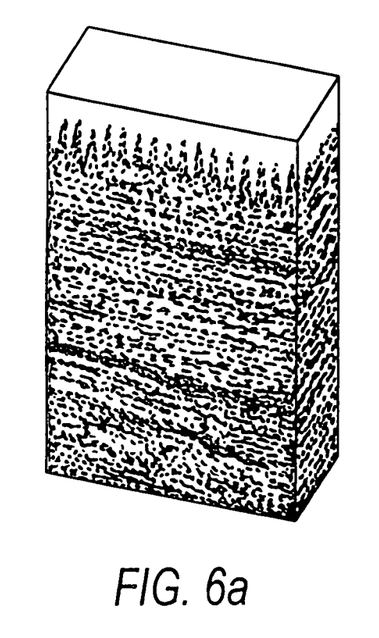
FIG. 6a is an example of 3-D post-stacked seismic data.
Figure 6B:
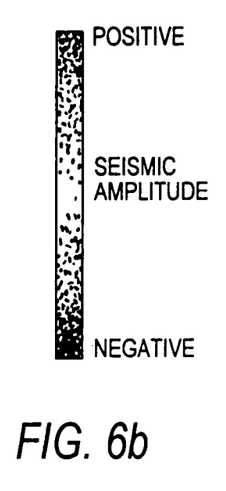
Figure 6C:
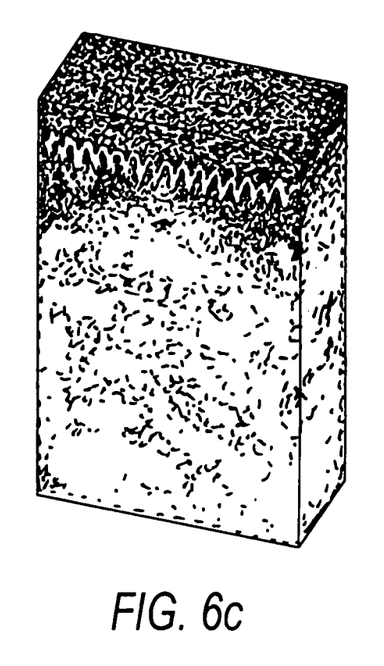
Figure 6D:
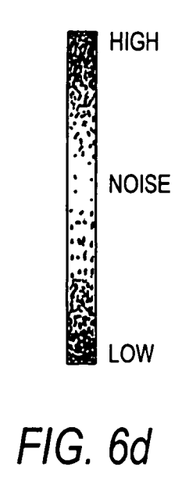
FIG. 6d shows a range of colors used to indicate levels of random noise in FIG. 6c.
Figure 7:
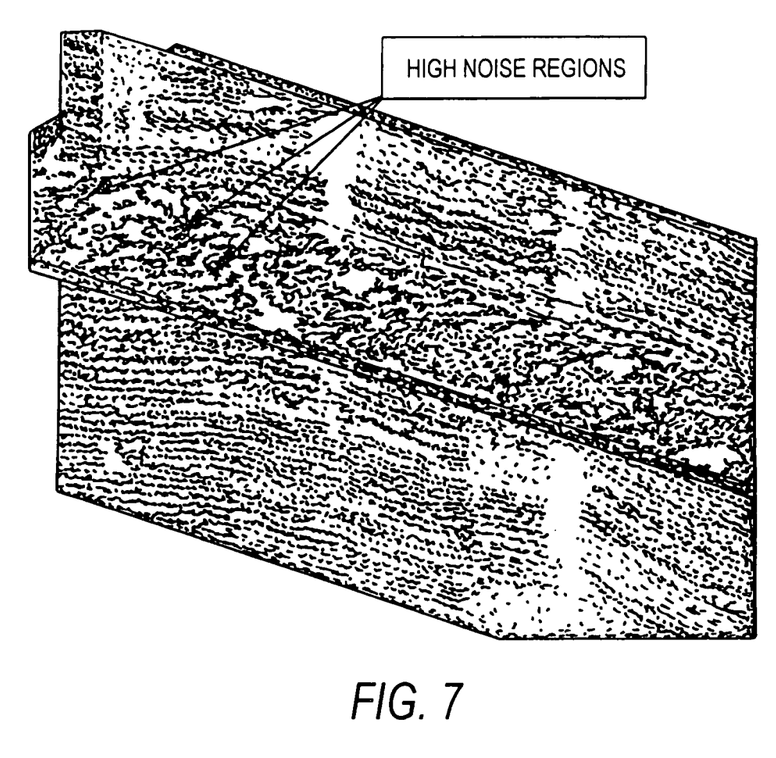
FIG. 7 shows a time slice of noise regions present in a 3-D post-stacked data set.

In a typical seismic profile, high noise areas are often accompanied by poor data acquisition or processing of complex geology. On the other hand, low noise locations are associated with strong reflectors. This is illustrated in FIG. 5a where seismic events are sharp near the strong reflector while events are foggy in vertical trends of "noise leakage". These features are clearly demonstrated in the noise estimation display of FIG. 5b. Comparison of FIGS. 5a and 5b reveal that a visual observation of noise in 5a matches well the display of the results of applying the noise estimation method of the present invention. Likewise, the high noise/low reliability areas of 3-D seismic data shown in FIG. 6a are readily identified using the substantially noise only 3-D image of in FIG. 6c. The high noise/low reliability areas of FIG. 6a are displayed in black in the noise estimation volume in FIG. 6c. In a preferred embodiment, the extreme high noise regions are displayed and/or printed in black in a color-map of FIG. 6d. FIG. 6b represents a display using a range of colors to indicate the seismic amplitude display of FIG. 6a;

An additional confirmation of data reliability and/or the presence of noise are accomplished using, for example, the time slice of data shown in FIG. 7. High noise areas of FIG. 7 are indicated in a distinguishing color, e.g., red.

The invention has been described in detail and through the presently preferred embodiments and examples. However, additional embodiments and modifications to the method will be apparent to those of ordinary skill in the art based on this description. The scope of the invention is therefore to be determined by the claims that follow.

We claim:

1. A method for identifying and displaying random noise from a post-stacked 3-dimensional seismic image using a computer system having a processor, the method comprising the steps of:

inputting into said processor data which represents a first 3-dimensional seismic image, wherein said image includes an image structure and noise, and wherein said image is divided into a plurality of pixels each having a value;

programming said processor with the following 3-dimensional mask:

$$\text{mask} = \begin{pmatrix} 1 & -2 & 1 \\ -2 & 4 & -2 \\ 1 & -2 & 1 \end{pmatrix}, \begin{pmatrix} -2 & 4 & -2 \\ 4 & -8 & 4 \\ -2 & 4 & -2 \end{pmatrix}, \begin{pmatrix} 1 & -2 & 1 \\ -2 & 4 & -2 \\ 1 & -2 & 1 \end{pmatrix},$$

where 1, −2, 4, and −8 represent coefficients of the mask having the properties of being zero sum and symmetrical;

applying the 3-dimensional mask to each pixel of the received seismic image data using the processor executing a predetermined image processing program, to generate a new 3-dimensional image in which image structure is suppressed such that the new, 3-dimensional image represents noise from the first 3-dimensional seismic image; and displaying the new 3-dimensional image on a display device.

2. A system for identifying and displaying random noise from a post-stacked 3-dimensional seismic image, the system comprising:

a computer having a processor and an input device for receiving data which represents a first 3-dimensional seismic image which includes an image structure and noise, and wherein said image is divided into a plurality of pixels each having a value; and a display device;

wherein said processor is programmed to execute a predetermined image processing program to apply the following 3-dimensional mask to each pixel of the received seismic image to generate a new 3-dimensional image:

$$\text{mask} = \begin{pmatrix} 1 & -2 & 1 \\ -2 & 4 & -2 \\ 1 & -2 & 1 \end{pmatrix}, \begin{pmatrix} -2 & 4 & -2 \\ 4 & -8 & 4 \\ -2 & 4 & -2 \end{pmatrix}, \begin{pmatrix} 1 & -2 & 1 \\ -2 & 4 & -2 \\ 1 & -2 & 1 \end{pmatrix},$$

thereby removing image structure from the first 3-dimensional seismic image such that the new 3-dimensional image represents noise from the first 3-dimensional seismic image; and wherein the display device displays the new 3-dimensional image.

* * * * *